UNITED STATES PATENT OFFICE.

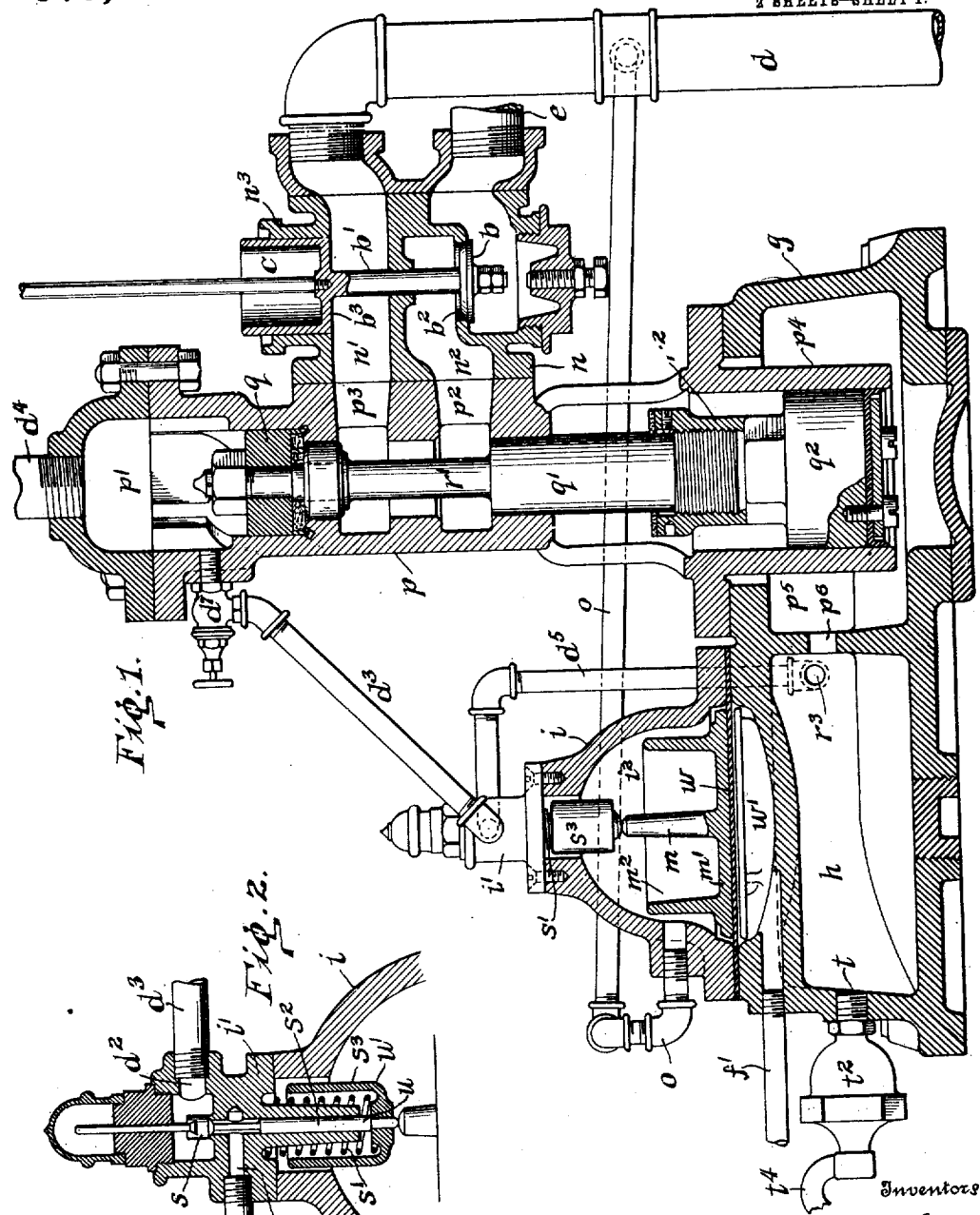

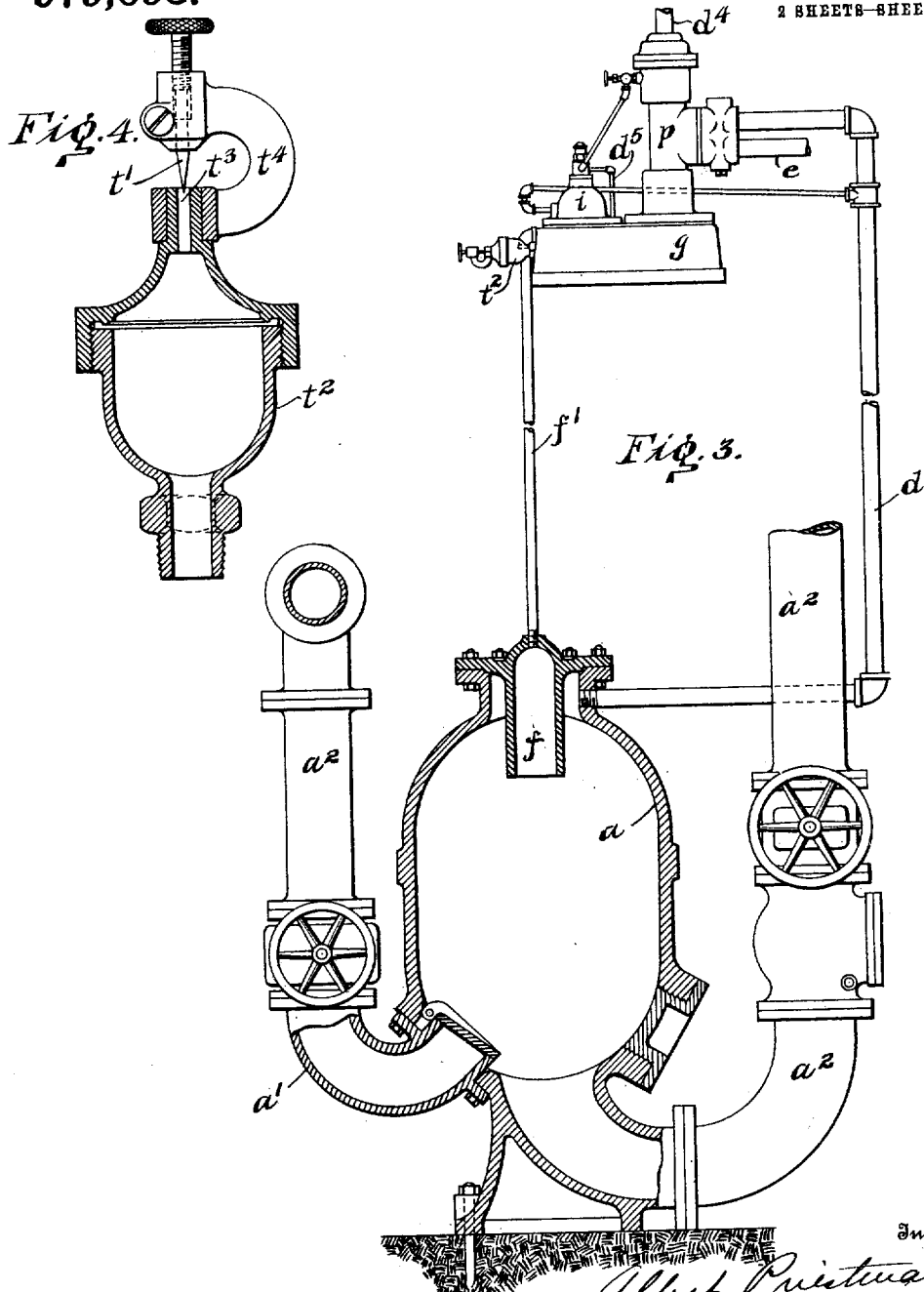

ALBERT PRIESTMAN AND EDWARD C. MOORE, OF PHILADELPHIA, PENNSYLVANIA; SAID MOORE ASSIGNOR TO MERRITT & COMPANY, A CORPORATION OF PENNSYLVANIA.

APPARATUS FOR CONTROLLING THE ADMISSION AND RELIEF OF PRESSURE TO TANKS AND OTHER APPLIANCES.

979,698.      Specification of Letters Patent.      Patented Dec. 27, 1910.

Application filed July 6, 1908. Serial No. 441,960.

*To all whom it may concern:*

Be it known that we, ALBERT PRIESTMAN, a subject of the King of Great Britain, and EDWARD C. MOORE, a citizen of the United States, and both residents of the city and county of Philadelphia, State of Pennsylvania, have invented an Improvement in Apparatus for Controlling the Admission and Relief of Pressure to Tanks and other Appliances, of which the following is a specification.

A part of our improvements relate to devices for automatically controlling a valve, which in turn controls the admission of pressure to a motor, by the pressure of the fluid controlled by the movements of such motor. An application of these devices is described at length hereinafter, in which the motor operates a valve mechanism to control the flow of compressed air or gas to a tank or appliance, and the admission of compressed air or gas to the motor to operate it is controlled by a valve which is in turn controlled by the pressure in the tank or appliance. Heretofore, it has been proposed in apparatus of this kind to control the opening of the controlling valve directly by the pressure in the tank or appliance, but the closing of the valve has been controlled by devices independent of such pressure. Such apparatus is shown in Letters Patent 914,497 and 914,673, dated March 9th, 1909. Not only has this necessitated the use of more or less complicated mechanism, but it has been difficult, by such means, to accomplish the quick and certain operation which is desired. It is usually desirable, in apparatus of this kind, that the closing of the controlling valve should follow very quickly after the opening, so that the valve is open just for the instant necessary to admit a charge of air or gas sufficient to operate the motor, the return of the motor being controlled by independent means.

It is one of the objects of our invention to control the closing of this controlling valve directly by the pressure of the air or gas admitted by the motor controlled valve mechanism, so that not only is such closing almost instantaneous, but it is accomplished by very simple and economical means.

Another part of our improvements relate to devices for controlling the exhaust or vent from the tank or appliance, to which the pressure is admitted, by the pressure in such appliance independently of the operation of the motor controlled valve mechanism which primarily controls the admission and discharge of the motor fluid. This is particularly of importance in that class of apparatus, such as sewage lifts, in which it is desirable to use the air or gas expansively. It is very desirable that the air or gas should be used expansively, as it enables a measured charge to be used at each operation, but to obtain the full advantages of such a system it is necessary that the measured charge should be just sufficient to do its work and that the pressure should not be relieved until the charge has accomplished that work by an expansion continued to the intended extent. The charge of compressed air should be only sufficient, when used expansively, to give a resulting pressure when the liquid has been forced from the tank, equal to the pressure due to the head against which the liquid has been lifted. The charge of compressed air is applied when the rising fluid has filled the receiver, but the exhaust vent opens, regardless of the falling level of the liquid, only when the pressure in the tank reaches a predetermined point. It has been proposed to accomplish this independent control of the exhaust by the pressure in the tank or appliance by the same means which control the operation of the controlling valve which controls the admission of motor fluid to the motor for actuating the main valve mechanism, but this is objectionable because it interferes to some extent with the control of the controlling valve. In carrying out this part of our invention we employ an auxiliary or secondary relief valve to control the vent or exhaust independently of the main valve mechanism and control it independently of the devices for actuating the controlling valve, so that the operation of such secondary relief valve depends solely upon the pressure in the tank or appliance, or on the force pipe which leads to it, and is not affected by any of the other mechanisms.

Our invention is particularly adapted for use in connection with sewage lifting apparatus for forcing sewage from a tank or receiver to a higher level, it is not however, restricted in its principal features to such use, but may be employed in connection with any appliance to which fluid pressure is to be applied and relieved at intervals.

In the drawings: Figure 1 is a vertical sectional view of apparatus embodying the invention, the controlling valve and its connections being shown in elevation; Fig. 2 is a vertical section enlarged of the controlling valve; Fig. 3 is a side elevation of the apparatus showing the same connected with a forcing tank, the latter being in vertical section; and Fig. 4 is a longitudinal section of the relief valve for the main valve mechanism on an enlarged scale.

$a$ is any appliance to which the pressure is applied at intervals; as shown it is a forcing tank or receptacle which receives sewage through a supply pipe $a'$ and from which the sewage is forced through a discharge pipe $a^2$.

$d$ is a fluid pressure pipe which leads to the upper part of the receptacle $a$.

$p$ is a valve cylinder having an inlet $p'$ at the top communicating with the pressure main $d^4$, an outlet port $p^2$ to the vent pipe $e$ and a port $p^3$ to the fluid pressure pipe $d$. In the upper part of the cylinder $p$ is a piston valve $q$ which controls communication between the port $p^3$ and the inlet chamber or space $p'$, and below this, carried by the piston rod or stem $r'$, is a valve $q'$ which controls the communication between the ports $p^2$ and $p^3$. The valves $q$ and $q'$ constitute the valve mechanism which controls the pressure pipe $d$ to admit pressure to the tank $a$ and to relieve the same. As shown the means for operating this valve device consists of a piston or pressure motor.

$p^4$ is a cylinder below the cylinder $p$ in which is a motor or piston $q^2$ connected by a suitable coupling $r^2$ with the valve mechanism $q$, $r'$, $q'$. The piston $q^2$ is of larger diameter than the piston valve $q$.

$d^5$ is a pressure pipe for admitting pressure below the piston $q^2$. As shown the cylinder $p^4$ is open at the bottom and fits in chamber $p^5$ in the base casting $g$. The pipe $d^5$ may lead directly into the chamber $p^5$, but we prefer (for the purpose hereinafter described) to have it lead, as at $r^3$, into a closed chamber $h$ which communicates through a suitable opening $p^6$ with the chamber $p^5$.

The admission of pressure through the pipe $d^5$ is controlled by a controlling valve $s$ (see Fig. 2). As shown the valve $s$ is arranged in a body $i'$ having an outlet $d'$ leading to the pipe $d^5$ and an inlet $d^2$ communicating with a branch $d^3$ from the pressure main $d^4$, or preferably, as shown, leading from the inlet chamber $p'$ in the head of the valve cylinder $p$.

$d^7$ is a hand valve in the branch $d^3$ by which the supply of pressure fluid from the main $d^4$ may be shut off. When the valve $s$ is opened air pressure from the branch $d^3$ will extend into the chamber $p^5$ and act on the piston $q^2$. The same pressure per square inch will then be acting oppositely on the piston $q$ and $q^2$ and by reason of the greater area of the latter, the piston will move upward and the vent port $p^2$ will be closed by the valve $q'$, while the valve $q$ will open communication between the port $p^3$ and the inlet chamber $p'$, and the air pressure will be admitted to the pipe $d$ and thence to the tank $a$ to discharge its contents.

$t$ is a vent to relieve the pressure in the chamber $p^5$ when the valve $s$ is closed. For convenience of illustration it is shown located at one end of the chamber $h$. When the valve $s$ is closed the pressure on the piston $q^2$ will be reduced, and when it has fallen sufficiently the parts $q$, $r'$, $q'$ and $q^2$ will move back. This will result in closing communication between the inlet $p'$ and port $p^3$ and opening communication between the ports $p^3$ and $p^2$ to the vent $e$. The vent $t$ may be regulated by a valve $t'$ (Fig. 4) to control the escape from below the piston $q^2$ and the time at which the valves $q$ and $q'$ will be operated. The construction of the valve $t'$ is not material but for purposes of illustration we have shown a cup $t^2$ adapted to be screwed into the vent opening and having a small orifice $t^3$ controlled by a needle valve $t'$ carried in an arm $t^4$ on the cup. As shown the valve $s$ is controlled automatically by the conditions, i. e. the accumulation of sewage in the tank $a$.

$f$ (Fig. 3) is a small bell in the upper part of the tank $a$, from which an air pipe $f'$ leads to a motor chamber $w'$ below the motor $w$, which, as shown, is formed in the base casting $g$ above the chamber $h$. Above the motor is a hollow dome $i$, on the top of which is located the valve body $i'$ of the valve $s$. The valve $s$ controls the thoroughfare between the inlet $d^2$ and outlet $d'$, and its stem $s^2$ which extends down through a tubular extension in the body $i'$ makes contact with a pin $m$ on a plate $m'$ on the upper face of the motor $w$.

$s'$ is a spring between the valve stem $s^2$ and the valve body acting to hold the valve normally closed. As shown the lower end of the valve stem $s^2$ carries an open cup $s^3$ which surrounds the spring and acts as the bearing for its lower end.

When the sewage fills the tank $a$ and forces air through the bell $f$ and pipe $f'$ into the motor chamber $w'$, the motor $w$ will be lifted and the pin $m$ acting on the valve stem $s^2$ will lift the valve $s$ and open communication between the pipes $d^3$ and $d^5$. $m^2$ is a cup or recess on the motor plate $m'$ to enable the motor to be conveniently weighted, as by the addition of shot, to regulate its action under the pressure in the motor chamber $w'$. It is desirable that the closing of the valve $s$, the opening of which is thus controlled by the conditions in the tank $a$, should also be controlled by these conditions. For this purpose we employ the dome $i$ forming a closed chamber $i^2$ above the motor $w$ and a pipe $o$ leading from the chamber $i^2$ to the force pipe $d$. As soon as the valves $q$ and $q'$ have been operated by the opening of the valve $s$ and air pressure is admitted to the pipe $d$, this pressure will also act through the pipe $o$ on the upper side of the motor and will force it back, thus enabling the spring $s'$ to close the valve $s$. This is possible because the direct pressure exerted through the pipe $o$ on the upper side of the motor $w$ plus the weight on the motor is greater than the pressure acting through the bell $f$ and pipe $f'$ on the lower side. The operation of the valve $s$ is therefore almost instantaneous, and the movement of the valves $q$ $q'$ in closing the inlet $p'$ and opening the vent port $p^2$ is controlled entirely by the relief of the pressure on the piston $q^2$ through the vent $t$. While the operation of the valve $s$ and the movement of the valves $q$ and $q'$ to open the port $p^3$ to the inlet $p'$ and to close the vent port $p^2$ are controlled by the conditions existing in the tank $a$, the opposite movement of the valves $q$ and $q'$ to close the inlet and open the vent port $p^2$ are independent of those conditions and are timed by the relief of the pressure through the vent $t$.

In some cases it is desirable that the time of operation of the valves $q$ and $q'$ should also be controlled by varying the cubical capacity of the space through which the pressure is exerted which acts on the piston $q^2$; and for this reason the chamber $h$ is employed. The pressure pipe $d^5$ instead of opening directly into the chamber $p^5$ below the piston $q^2$ leads into the chamber $h$ which communicates through suitable openings $p^6$ with the chamber $p^5$. It is obvious that the interval of time before the piston $q^2$ will be operated after the valve $s$ has been actuated, will depend upon the cubical capacity of the chamber $h$, and this cubical capacity may be varied—and consequently the time of operation of the piston $q^2$—by the introduction of liquid in the chamber $h$. Such liquid may be introduced through the vent $t$ (the valve $t^2$ being removed) or through any other convenient plugged opening provided for the purpose. It is very desirable in apparatus of this kind that the air should be used expansively, so that only that charge of air need be used at each operation which will be sufficient, acting expansively, to give a resulting pressure sufficient to lift the liquid to the point of discharge. This result is accomplished by controlling the vent from the tank by the pressure in the tank, so that the vent will not open to relieve the pressure in the tank until that pressure has, by expansion, fallen to an amount slightly in excess of the pressure due to the head against which the expelled liquid has been lifted. For this purpose we employ the secondary exhaust valve $b$ controlling communication between the vent port $p^2$ and the vent pipe or outlet $e$. As shown this valve $b$ is located in a valve box $n$ having passageways $n'$ and $n^2$ communicating respectively between the port $p^3$ and the force pipe $d$, and between the exhaust port $p^2$ and the vent pipe or outlet $e$. The valve $b$ opens outwardly and controls a thoroughfare $b^2$ in the passageway $n^2$; the valve stem $b'$ extends through the passageway $n'$ and carries a piston $b^3$ moving freely in an open cylinder $n^3$ in the valve box and subjected to the pressure in the passageway $n'$. The diameter of the piston $b^3$ is slightly greater than that of the valve $b$. The valve and piston are loose and normally will occupy a lowered position by gravity with the valve $b$ open. The valve may be additionally weighted by the introduction of shot in the recess $c$ above the piston $b^3$.

When the valves $q$, $q'$ have been operated to close the inlet $p'$ and open communication between the ports $p^2$ and $p^3$ as shown in Fig. 1, the pressure in the tank $a$ exerted through the force pipe $d$ will act oppositely on the piston $b^3$ and the valve disk $b$, and if sufficient to overcome the weight of the valve mechanism, will, because of the greater area of the piston $b^3$, hold the mechanism raised with the valve $b$ closed. As soon however, as the pressure becomes too weak to overcome the weight of the mechanism by reason of the difference in the areas of $b^3$ and $b$, the mechanism will drop and the valve $b$ will open. It follows that by properly regulating the weight of the valve mechanism, the valve $b$ may be set to open at that pressure which will have been reached in the tank $a$ when the air has completed its effective expansion.

While we prefer the details of construction shown they may be varied without departing from the invention.

What we claim is as follows:

1. In apparatus of the character specified, the combination of an appliance to which the pressure is to be applied, valve mechanism exterior to the appliance to control the admission of pressure to said appliance, means to control said valve mechanism, a relief valve to control the relief of the pressure from the appliance independently of said valve mechanism, and means independent of the means to control said valve mechanism and controlled by the pressure in the appliance exterior to said appliance to control said relief valve.

2. In apparatus of the character specified, the combination of an appliance to which pressure is to be applied, a delivery pipe leading to said appliance, valve mechanism to control the admission and relief of fluid pressure in said delivery pipe, and a secondary valve for controlling the relief of said delivery pipe independently of the valve mechanism and controlled directly by the pressure in the delivery pipe, said valve devices being all located exterior to the appliance so as not to be subjected to contact with the contents thereof.

3. In apparatus of the character specified, the combination of an appliance to which pressure is to be applied, a delivery pipe leading to said appliance, valve mechanism to control the admission of fluid pressure to said delivery pipe, and a valve for controlling the relief of said delivery pipe independently of the valve mechanism which controls the admission of pressure to said pipe and controlled by the pressure in said delivery pipe, said valve devices being all located exterior to the appliance so as not to be subjected to contact with the contents thereof.

4. In apparatus of the character specified, the combination of an appliance to which the pressure is to be applied, a delivery pipe leading to said appliance, a pressure supply pipe and a vent, valve mechanism exterior to the appliance to control communication between said delivery pipe and the pressure pipe and vent respectively, means controlled by the conditions in the appliance to operate said valve mechanism to open communication between the pressure supply pipe and delivery pipe, means to control the return of said valve mechanism to open communication between the delivery pipe and vent, and means exterior to the appliance and independent of the means to control the valve mechanism, to control said vent and controlled by the pressure in the appliance.

5. In apparatus of the character specified, the combination of an appliance to which the pressure is to be applied, a delivery pipe leading to said appliance, a pressure supply pipe and a vent, valve mechanism exterior to the appliance to control communication between said delivery pipe and the pressure pipe and vent respectively, means controlled by the conditions in the appliance to operate said valve mechanism to open communication between the pressure supply pipe and delivery pipe, means to control the return of said valve mechanism to open communication between the delivery pipe and vent, and a secondary valve exterior to the appliance for controlling said vent independently of said valve mechanism subjected to and controlled by the pressure in said delivery pipe.

6. In apparatus of the character specified, the combination of a pipe to which pressure is to be applied, valve mechanism to control the admission of fluid pressure to said pipe, a pressure motor for operating said valve mechanism, a controlling valve to control the admission of fluid pressure to said motor, means controlled by the pressure admitted to the pipe immediately on its admission to actuate said controlling valve and shut off further admission of fluid pressure to the motor for operating said valve mechanism, and means to control the return of the pressure motor and the closing of valve mechanism operated thereby controlled independently of the pressure in said pipe to which the pressure is applied.

7. In apparatus of the character specified, the combination of an appliance to which pressure is to be applied, valve mechanism to control the admission and relief of fluid pressure to said appliance, means to control the operation of said valve mechanism, a controlling valve to control said means for operating said valve mechanism, means controlled by the pressure in the appliance for both opening and closing said controlling valve, and means independent of said controlling valve and of the pressure in the appliance to control the operation of said valve mechanism and its controlling means to relieve the pressure in said appliance.

8. In apparatus of the character specified, the combination of an appliance to which the pressure is to be applied, a delivery pipe leading to said appliance, valve mechanism to control the admission of fluid pressure to said appliance through said delivery pipe, means to operate said valve mechanism, a controlling valve to control said means to operate said valve mechanism, means controlled by the pressure admitted to the delivery pipe immediately upon its admission by said valve mechanism to actuate said controlling valve and shut off further admission of fluid pressure to the means to operate said valve-mechanism, and means independent of said controlling valve and of the pressure in the appliance to control the operation of said valve mechanism and its operating means to relieve the pressure in said delivery pipe and appliance.

9. In apparatus of the character specified, the combination of an appliance to which the pressure is to be applied, a delivery pipe leading to said appliance, valve mechanism to control the admission of fluid to said appliance through said delivery pipe, means to operate said valve mechanism, a controlling valve to control said means to operate said valve mechanism, means controlled by the conditions in the appliance to open said controlling valve, means controlled by the pressure admitted to the delivery pipe immediately upon its admission by said valve mechanism to close said controlling valve and shut off further admission of fluid pressure to the means to operate said valve mechanism, and means independent of said controlling valve and of the pressure in the appliance to control the operation of said valve mechanism and its operating means to relieve the pressure in said delivery pipe and appliance.

10. In apparatus of the character specified, the combination of an appliance to which pressure is to be applied, a delivery pipe leading to said appliance, valve mechanism to control the admission of fluid pressure to said appliance through said delivery pipe, means to operate said valve mechanism, a controlling valve to control said means to operate said valve mechanism, means controlled by the pressure admitted to the delivery pipe immediately on its admission by said valve mechanism to actuate said controlling valve and shut off further admission of fluid pressure to the means to operate said valve mechanism, and a valve for controlling the relief of said delivery pipe independently of the valve mechanism which controls the admission of pressure to said pipe and is controlled by the pressure in said delivery pipe, said valve devices being all located exterior to the appliance so as not to be subjected to contact with the contents thereof.

11. In apparatus of the character specified, the combination of an appliance to which the pressure is to be applied, a delivery pipe leading to said appliance, valve mechanism to control the admission of fluid pressure to said appliance through said delivery pipe, means to operate said valve mechanism, a controlling valve to control said means to operate said valve mechanism, and means controlled by the pressure admitted to the delivery pipe immediately upon its admission by said valve mechanism to actuate said controlling valve and shut off further admission of fluid pressure to the means to operate said valve-mechanism, a secondary valve for controlling the relief of said delivery pipe independent of the means for controlling the controlling valve and controlled by the pressure in said appliance.

In testimony of which invention, we have hereunto set our hands.

ALBERT PRIESTMAN.
EDWARD C. MOORE.

Witnesses:
E. B. BESSELIEVRE,
R. M. KELLY.